US008134436B2

(12) United States Patent
Yasoshima

(10) Patent No.: US 8,134,436 B2
(45) Date of Patent: Mar. 13, 2012

(54) LINEAR SOLENOID

(75) Inventor: Hiroshi Yasoshima, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 12/956,172

(22) Filed: Nov. 30, 2010

(65) Prior Publication Data

US 2011/0128104 A1 Jun. 2, 2011

(30) Foreign Application Priority Data

Dec. 1, 2009 (JP) ................................ 2009-273201

(51) Int. Cl.
*H01F 7/08* (2006.01)
*F16K 31/02* (2006.01)

(52) U.S. Cl. .................................. 335/220; 251/129.15

(58) Field of Classification Search .................. 335/220; 251/129.15

See application file for complete search history.

(56) References Cited

U.S. PATENT DOCUMENTS

| | | | | |
|---|---|---|---|---|
| 6,206,343 | B1 * | 3/2001 | Kato et al. | 251/129.15 |
| 6,498,416 | B1 * | 12/2002 | Oishi et al. | 310/214 |
| 6,604,726 | B2 * | 8/2003 | Kumar | 251/129.16 |
| 6,953,186 | B2 * | 10/2005 | Kaneda et al. | 251/129.2 |
| 7,468,647 | B2 * | 12/2008 | Ishibashi et al. | 335/281 |
| 7,973,627 | B2 * | 7/2011 | Yamagata et al. | 335/255 |
| 2001/0009164 | A1 * | 7/2001 | Motoki et al. | 137/625.65 |
| 2002/0134444 | A1 * | 9/2002 | Isobe | 137/625.65 |
| 2004/0112445 | A1 * | 6/2004 | Fischer | 137/625.64 |
| 2006/0017535 | A1 * | 1/2006 | Nagasaki | 335/220 |
| 2006/0243938 | A1 | 11/2006 | Ishibashi et al. | |

FOREIGN PATENT DOCUMENTS

| | | |
|---|---|---|
| JP | 2004-144230 | 5/2004 |

* cited by examiner

*Primary Examiner* — Elvin G Enad
*Assistant Examiner* — Alexander Talpalatskiy
(74) *Attorney, Agent, or Firm* — Nixon & Vanderhye PC

(57) ABSTRACT

A linear solenoid includes a biasing portion to bias a ring core onto a bottom of a cup-shape yoke in an axis direction. The ring core has an attachment portion to which the biasing portion is attached, and the attachment portion is located only on an outer circumference side of the ring core. The biasing portion shortens a dimension of the ring core in the axis direction only on the outer circumference side, and the biasing portion is located between the attachment portion of the ring core and a coil accommodation resin to accommodate a coil in the axis direction.

7 Claims, 5 Drawing Sheets

LINEAR SOLENOID

CROSS REFERENCE TO RELATED APPLICATION

This application is based on Japanese Patent Application No. 2009-273201 filed on Dec. 1, 2009, the disclosure of which is incorporated herein by reference in its entirety.

BACKGROUND OF THE INVENTION

1. Field of the Invention

The present invention relates to a linear solenoid.

2. Description of Related Art

JP-A-2004-144230 describes an electromagnetic hydraulic control valve shown in FIG. 5A, and the control valve includes a spool valve 21 and a linear solenoid 1 to drive the spool valve 21. The linear solenoid 1 has a coil 2, a plunger 7, and a magnetic stator 31. The magnetic stator 31 is a component constituting a magnetic circuit, and includes a stator core 6 and a yoke 8. The plunger 7 is arranged inside of the stator core 6. The yoke 8 is made of magnetic member, and has an approximately cup shape to cover an outer periphery of the coil 2.

The stator core 6 integrally has a magnetism attraction core 3, a magnetism transmittance core 5 and a magnetism blocker 4. The magnetism attraction core 3 attracts the plunger 7 in an axis direction by using magnetism. The magnetism transmittance core 5 has a tube shape to cover the plunger 7, and the plunger 7 directly slides on the core 5. The blocker 4 inhibits magnetic coupling between the attraction core 3 and the transmittance core 5. The plunger 7 is driven in the axis direction by changing current value supplied to the coil 2. The driven plunger 7 displaces a spool 23 of the spool valve 21 in the axis direction.

In the linear solenoid 1 of FIG. 5A, the stator core 6 is inserted into the yoke 8 through an opening of the yoke 8, and a left end of the stator core 6 adjacent to the attraction core 3 is fixed to an edge of the opening of the yoke 8. As shown in FIG. 5B, a right end of the stator core 6 adjacent to the transmittance core 5 is not fixed to a bottom 8*a* of the cup-shaped yoke 8. The transmittance core 5 has a free edge corresponding to right side in FIG. 5B, and the free edge is located inside of a concave 34 defined in center section of the bottom 8*a* of the yoke 8. Magnetic flux is transmitted between an inner circumference face of the concave 34 of the yoke 8 and an outer circumference face of the transmittance core 5 in a radial direction.

Sufficient assembling clearance $\alpha$ is necessary between the free edge of the transmittance core 5 and a wall of the concave 34 in the radial direction. The clearance $\alpha$ absorbs a product variation or axial gap error of the stator core 6. However, as the clearance $\alpha$ becomes larger, a density of the magnetic flux is lowered, because a magnetic circuit is constituted through the clearance $\alpha$. In this case, an attraction performance of the plunger 7 is lowered.

Moreover, the clearance $\alpha$ may have a variation in the radial direction, due to attachment tolerance of the stator core 6, for example. At this time, the magnetic flux easily flows through a narrower clearance concentratedly when electricity is supplied to the coil 2. That is, a bias of the magnetic flux will be generated when the magnetic flux is transmitted between the plunger 7 and the transmittance core 5 in the radial direction. Further, a lateral force may be generated to the plunger 7 in the radial direction by the bias of the magnetic flux. The lateral force is applied in a direction in which the bias of the magnetic flux is generated. In this case, the plunger 7 and the stator core 6 may be prevented from having smooth sliding operation.

JP-A-2006-307984 discloses a linear solenoid 1 shown in FIG. 6A to solve the above disadvantages. The linear solenoid 1 includes a ring core 11P located between a coil accommodation resin 9 and a bottom 8*a* of a yoke 8 in an axis direction. The coil accommodation resin 9 corresponds to a bobbin having a coil 2, or a secondary molding resin molding the bobbin. The ring core 11P magnetically couples the yoke 8 and a transmittance core 5. The ring core 11P is fitted around an outer circumference of the transmittance core 5. Magnetic flux is transmitted between the ring core 11P and the transmittance core 5 in the radial direction, and is transmitted between the ring core 11P and the bottom 8*a* of the yoke 8 in the axis direction.

The linear solenoid 1 further includes a biasing portion 13P to press the ring core 11P toward the bottom 8*a* of the yoke 8 in the axis direction. Thus, the magnetic coupling between the ring core 11P and the bottom 8*a* of the yoke 8 can be enhanced. The biasing portion 13P is an elastic component, for example, a ring-shaped rubber or spring. The biasing portion 13P is compressed between the coil accommodation resin 9 and the ring core 11P in the axis direction. Therefore, a space for locating the biasing portion 13P is necessary between the resin 9 and the ring core 11P in the axis direction, in a case where the linear solenoid 1 has the ring core 11P. A total dimension of the linear solenoid 1 in the axis direction may become long by the length of the biasing portion 13P.

A dimension of the ring core 11P or the coil 2 in the axis direction may be made short so as to reduce the space of the biasing portion 13P. However, if the dimension of the ring core 11P is shortened in the axis direction, a transmitting amount of magnetic flux is reduced, because opposing area between the ring core 11P and the transmittance core 5 is decreased. In this case, a density of the magnetic flux in the linear solenoid 1 is lowered, and attraction performance of the plunger 7 is lowered. In contrast, if the dimension of the coil 2 is shortened in the axis direction, magnetic force generated by the coil 2 is reduced, and attraction performance of the plunger 7 is lowered.

SUMMARY OF THE INVENTION

In view of the foregoing and other problems, it is an object of the present invention to provide a linear solenoid.

According to an example of the present invention, a linear solenoid includes a coil, a tube-shaped coil accommodation resin, a cup-shaped yoke, a ring core and a biasing portion. The coil generates a magnetic force by being supplied with electricity. The coil accommodation resin accommodates the coil. The yoke is made of magnetic member, and covers an outer periphery of the coil. The cup-shaped yoke has a bottom and an opening opposite from each other in an axis direction. The ring core is made of magnetic member, and is located between the coil accommodation resin and the bottom of the yoke in the axis direction. The biasing portion biases the ring core onto the bottom of the yoke in the axis direction. The ring core has an attachment portion to which the biasing portion is attached. The attachment portion is located on an outer circumference side of the ring core, and is located adjacent to the coil. The biasing portion is configured to shorten a dimension of the ring core in the axis direction only on the outer circumference side, and the biasing portion is located between the attachment portion of the ring core and the coil accommodation resin in the axis direction.

Accordingly, a total length of the linear solenoid can be made short without a lowering of magnetic flux.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1A:
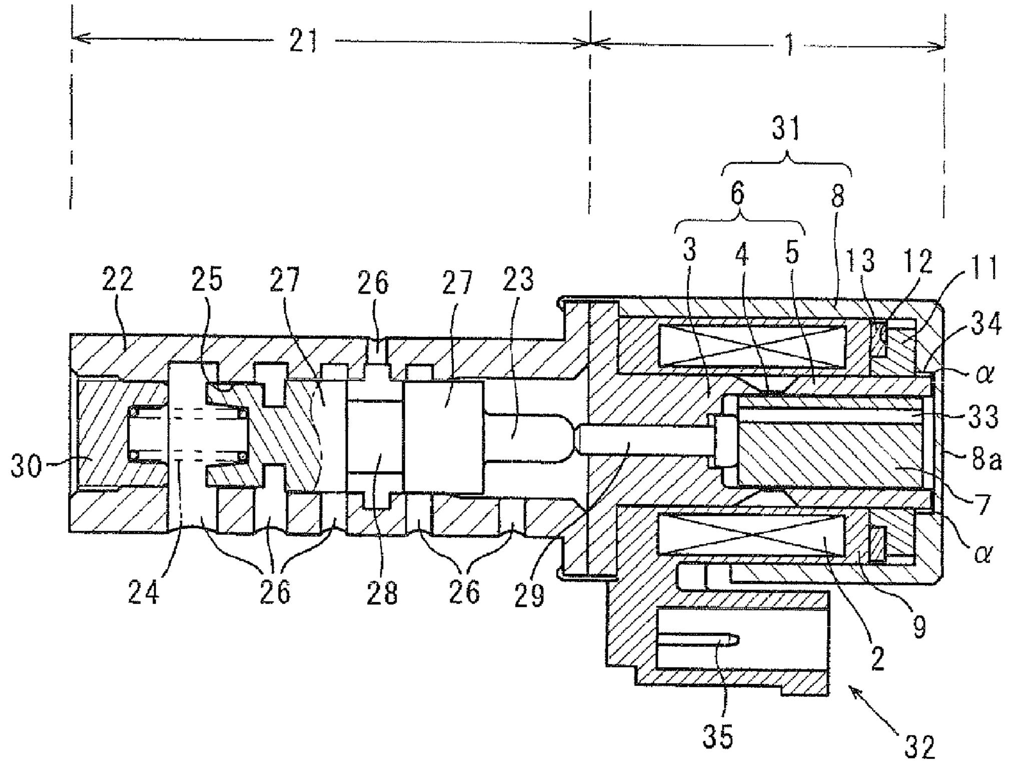
FIG. 1A is a schematic cross-sectional view illustrating an electromagnetic spool valve including a linear solenoid according to a first embodiment.
Figure 1B:
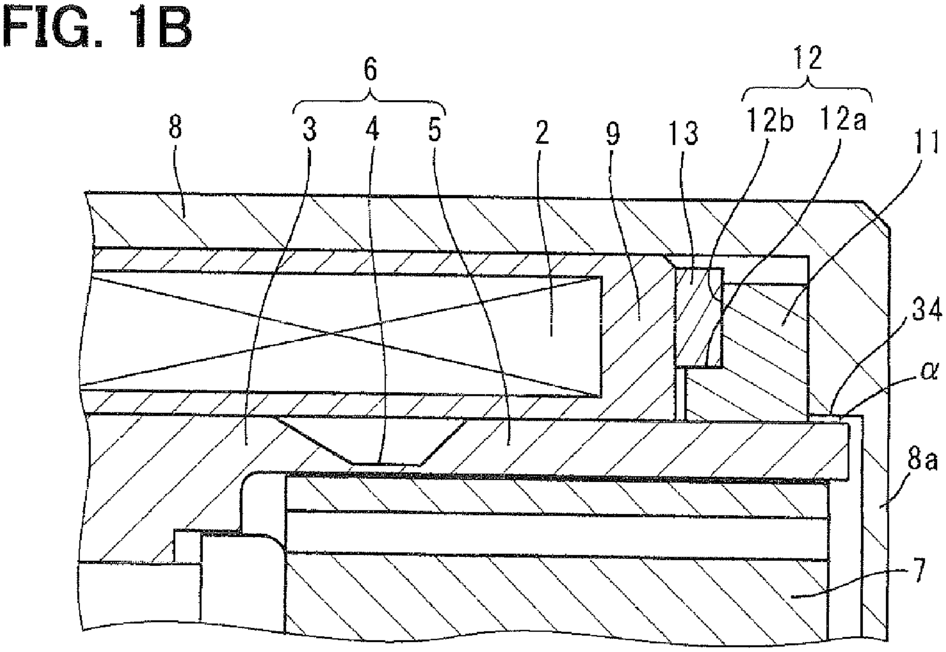
FIG. 1B is an enlarged cross-sectional view illustrating the linear solenoid.

A first embodiment will be described with reference to FIGS. 1A and 1B. Left side of FIGS. 1A and 1B is explained as a front side, and right side of FIGS. 1A and 1B is explained as a rear side. However, directions of the front side and the rear side are not limited in an actual mounting direction.

A linear solenoid 1 is an electromagnetic actuator to directly or indirectly drive an object such as valve, and includes a coil 2, a stator core 6, a plunger 7 and a yoke 8. The coil 2 generates magnetic force by being supplied with electricity. The stator core 6 is made of magnetic member, and integrally has a magnetism attraction core 3, a magnetism blocker 4, and a magnetism transmittance core 5. The plunger 7 is made of magnetic member, and directly slides on an inner circumference face of the transmittance core 5. The yoke 8 is made of magnetic member, and has an approximately cup shape to cover an outer periphery of the coil 2.

A front side of the stator core 6 adjacent to the attraction core 3 is fixed to a front end portion of the yoke 8 corresponding to an opening side of the cup-shaped yoke 8. A rear side of the stator core 6 adjacent to the transmittance core 5 is not fixed to a bottom 8*a* of the cup-shaped yoke 8. A rear portion of the transmittance core 5 passes through a coil accommodation resin 9 to accommodate the coil 2, and is protruded rearward from the coil accommodation resin 9.

A ring core 11 is arranged between the coil accommodation resin 9 and the bottom 8*a* of the yoke 8 in an axis direction. The ring core 11 is made of magnetic member, and has a ring shape. The ring core 11 is fitted around an outer circumference of the transmittance core 5 protruded from the coil accommodation resin 9. Magnetic flux is transmitted between the ring core 11 and the transmittance core 5 in a radial direction, and magnetic flux is transmitted between the ring core 11 and the bottom 8*a* of the yoke 8 in the axis direction.

The ring core 11 has an attachment portion 12 to which a biasing portion 13 is attached. The attachment portion 12 is located on a front and outer circumference side of the ring core 11 adjacent to the coil 2. A dimension of the ring core 11 in the axis direction is made short only on the outer circumference side. The biasing portion 13 is arranged between the attachment portion 12 and an annular rear face of the coil accommodation resin 9 in the axis direction. The biasing portion 13 presses the ring core 11 onto the bottom 8*a* of the yoke 8.

The linear solenoid 1 is applied to an electromagnetic hydraulic control valve of an automatic shift, for example.

A structure of the electromagnetic hydraulic control valve will be explained with reference to FIG. 1A. The control valve is mounted in an hydraulic control device of the automatic shift. Specifically, the control valve is attached to an hydraulic controller case arranged at a lower part of the automatic shift, and includes a spool valve 21 and the linear solenoid 1 to drive the spool valve 21.

The spool valve 21 has a sleeve 22, a spool 23, and a return spring 24, for example. The sleeve 22 has an approximately cylindrical shape. An insert hole 25 is defined in a center of the sleeve 22, and slidably supports the spool 23. An oil port 26 is defined to extend in the radial direction of the sleeve 22. The oil port 26 may be an input port, output port, discharge port or drain port. The input port communicates with an oil discharge port of an oil pump (not shown), and an input pressure is supplied to the input port. An output pressure adjusted by the control valve is output through the output port. The discharge port communicates with a low-pressure side. The drain port is used for ventilation.

The spool 23 is slidably arranged in the sleeve 22, and changes an open area of the oil port 26. The spool 23 switches communication state of the oil port 26, and includes plural lands 27 and a small diameter part 28. The land 27 closes the oil port 26, and the small diameter part 28 is arranged between the lands 27. A front end of a shaft 29 extending inside of the linear solenoid 1 is contact with a rear end of the spool 23. A rear end of the shaft 29 is contact with a front end face of the plunger 7. The plunger 7 is arranged to drive the spool 23 in the axis direction.

The spring 24 is a compression coil spring to bias the spool 23 rearward, and is arranged in a spring chamber located in a front part of the sleeve 22 in a compression state. One end of the spring 24 is contact with a front face of the spool 23, and the other end is contact with a bottom face of an adjustment screw 30 to close a front end of the insert hole 25 of the sleeve 22. A biasing force of the spring 24 can be adjusted by a screwing amount of the adjustment screw 30.

The linear solenoid 1 has the coil 2, the plunger 7, a magnetic stator 31, and a connector 32. When electricity is supplied to the coil 2, magnetic force is generated, and a loop of magnetic flux is formed. The loop of magnetic flux passes through the plunger 7 and the magnetic stator 31. The coil 2 is formed by winding conducting wire, such as enameled wire having insulation cover, around a resin bobbin 33 corresponding to a part of the coil accommodation resin 9.

The plunger 7 is made of magnetic member, for example, a ferromagnetic material such as iron, and has an approximately pillar shape. The plunger 7 directly slides on the inner circumference face of the magnetic stator 31. Specifically, the plunger 7 slides on an inner circumference face of a sliding hole defined inside of the stator core 6. Because the front end face of the plunger 7 is contact with a tip end of the shaft 29 of the spool 23, the plunger 7 is also biased rearward by the biasing force of the spring 24 together with the spool 23. A ventilation pore/slot 33 extends inside of the plunger 7 in the axis direction.

The magnetic stator 31 is constructed by the yoke 8 and the stator core 6. The yoke 8 is made of magnetic member, and has an approximately cup shape to cover an outer periphery of the coil 2. The stator core 6 is made of magnetic member, and integrally has the magnetism attraction core 3, the magnetism blocker 4, and the magnetism transmittance core 5. The stator core 6 is inserted into the yoke 8 from a front side opening of the yoke 8, and is fixed to a front end portion of the yoke 8 corresponding to the front side opening together with the sleeve 22.

The yoke 8 is made of magnetic metal, for example, ferromagnetic material such as iron, and magnetic flux passes through the yoke 8. After components of the linear solenoid 1 are disposed in the yoke 8, a nail part defined on a front end of the yoke 8 is firmly combined with the sleeve 22.

The attraction core 3 opposes to the plunger 7 in the axis direction, and is made of magnetic metal, for example, ferromagnetic material such as iron, so as to magnetically attract the plunger 7. A magnetism attraction part corresponding to a main magnetism gap is defined between the attraction core 3 and the plunger 7.

The attraction core 3 has a sliding hole, and the sliding hole supports the shaft 29 to slide in the axis direction. The attraction core 3 integrally has a flange to be magnetically combined with an open end of the yoke 8. The flange may be separated from the attraction core 3. A ventilation pore/slot (not shown) extends inside of the attraction core 3 in the axis direction.

A tube-shape concave is defined in a rear part of the attraction core 3, and an end portion of the plunger 7 is located in the concave. The attraction core 3 and a front part of the plunger 7 overlap with each other in the axis direction. Because a taper is formed on a rear side outer face of the concave, magnetic attraction force is not changed even if a stroke amount of the plunger 7 is changed.

The blocker 4 is a magnetic saturation part to restrict the magnetic flux from directly flowing between the attraction core 3 and the transmittance core 5. The blocker 4 has a membrane shape, thereby magnetic reluctance is made larger. Specifically, the blocker 4 is a thin-wall part defined by forming an annular slot on an outer circumference face of the stator core 6. The blocker 4 is defined between a bottom face of the annular slot and the inner circumference face of the stator core 6. Moreover, many micropores are defined all the circumferences of the blocker 4 by laser beam machining. Therefore, magnetism screening effect can be enhanced between the attraction core 3 and the transmittance core 5.

The transmittance core 5 is made of magnetic metal, for example, ferromagnetic material such as iron, and has a cylindrical shape which covers approximately entire of the plunger 7. The magnetic flux is transmitted between the plunger 7 and the transmittance core 5 in the radial direction. A magnetic delivery part corresponding to a side magnetism gap is defined between the transmittance core 5 and the plunger 7. The transmittance core 5 is arranged on an inner side of the coil 2 in the radial direction. A rear part of the transmittance core 5 is protruded rearward from the coil 2. A rear end portion of the transmittance core 5 is arranged in a concave 34 defined in a center of the bottom 8*a* of the yoke 8.

The connector 32 is electrically connected with an electronic control unit (not shown AT-ECU) to control the control valve through a connection line. The connector 32 is formed by a part of the secondary molding resin which molds peripheries of the coil 2 and the bobbin. A terminal 35 is arranged in the connector 32, and is connected to each end of the coil 2. In this embodiment, the bobbin corresponds to a primary molding resin, and the coil accommodation resin 9 accommodating the coil 2 represents the primary molding resin and the secondary molding resin. The coil accommodation resin 9 has a tube-shape fitted around the outer circumference of the stator core 6.

The ring core 11 raises the magnetic coupling between the yoke 8 and the transmittance core 5. The stator core 6 is inserted into the yoke 8 from the opening of the yoke 8, and is fixed to edge of the opening of the yoke 8. As shown in FIG. 1B, a right-side tip end portion of the transmittance core 5 is located opposite from the opening of the yoke 8 corresponding to a fix portion, and the tip end portion is not fixed to the bottom 8*a* of the yoke 8. If the transmittance core 5 is arranged inside the concave 34 of the bottom 8*a* of the yoke 8 in this un-fixed state, the tip end portion of the transmittance core 5 may hit a wall of the concave 34, due to product variation or axial gap error of the stator core 6. In this case, the transmittance core 5 may have a deformation, and sliding property of the plunger 7 may be affected by the deformation.

Therefore, an assembling clearance $\alpha$ is required between the tip end portion of the transmittance core 5 and the wall of the concave 34 of the yoke 8 in the radial direction. The assembling clearance $\alpha$ absorbs the product variation or the axial gap error of the stator core 6 at an assembling time. However, magnetism transmission efficiency will be lowered, as the assembling clearance $\alpha$ becomes larger. Further, the magnetism attraction performance of the plunger 7 will be lowered. Moreover, if a variation is generated in the clearance $\alpha$ in the radial direction, a bias of the magnetic flux will be generated when electricity is supplied to the coil 2. A lateral force occurs to the plunger 7 in the radial direction, and the plunger 7 and the stator core 6 may be prevented from having smooth sliding operation.

Therefore, the ring core 11 is fixed to the outer circumference face of the transmittance core 5, and magnetically combines with both of the transmittance core 5 and the bottom 8*a* of the yoke 8. The ring core 11 is mounted to the transmittance core 5 protruded rearward from the coil 2.

The biasing portion 13 is arranged between the ring core 11 and the coil accommodation resin 9 in the axis direction. The biasing portion 13 presses the ring core 11 onto the bottom 8*a* of the yoke 8 in the axis direction. The biasing portion 13 is provided for ensuring transmittance of the magnetic flux between the ring core 11 and the bottom 8*a* of the yoke 8 by compulsorily making the ring core 11 to contact the bottom 8*a* of the yoke 8, even if electricity is not supplied to the coil 2, or even if an amount of electricity supplied to the coil 2 is small.

The ring core 11 and the biasing portion 13 are specifically explained. The ring core 11 is made of magnetic member, for example, ferromagnetic material such as iron, and has a ring disk shape fitted around the outer circumference of the transmittance core 5. The ring core 11 is attached between the coil accommodation resin 9 and the bottom 8*a* of the yoke 8 in the axis direction. An inner circumference face of the ring core 11 has a cylinder face approximately parallel to the outer circumference face of the transmittance core 5 through a minute assembling clearance. A dimension of the inner circumference face of the ring core 11 in the axis direction is slightly shorter than a distance between the coil accommodation resin 9 and the bottom 8*a* of the yoke 8 in the axis direction.

A rear end face of the ring core 11 contacting the bottom 8*a* has a shape agree with the bottom 8*a*. Specifically, each of the front end face of the bottom 8*a* to contact the ring core 11, and the rear end face of the ring core 11 is a ring-shaped plane approximately perpendicular to the center axis. A dimension of a rear end portion of the ring core 11 in the radial direction is set slightly smaller than a distance between the transmittance core 5 and an inner circumference face of the yoke 8 in the radial direction. Specifically, a clearance distance between an outer edge of the rear portion of the ring core 11 and the inner circumference face of the yoke 8 is set slightly larger than the clearance α between the transmittance core 5 and the concave 34 in the radial direction.

The ring core 11 has the attachment portion 12 to which the biasing portion 13 is attached. The attachment portion 12 is located on a front outer circumference face of the ring core 11 adjacent to the coil 2. A dimension of the ring core 11 in the axis direction is made short only on the outer circumference side. The attachment portion 12 is provided for incorporating the biasing portion 13 in a clearance between the coil accommodation resin 9 and the attachment portion 12. The attachment portion 12 has an annular step shape.

In this embodiment, the attachment portion 12 has an annular shape over all circumferences on a front face of the ring core 11. Specifically, the attachment portion 12 has a cylinder face 12*a* and a ring face 12*b*. The biasing portion 13 is fitted to an outer circumference face of the cylinder face 12*a*, and is contact with the ring face 12*b* in the axis direction. The cylinder side 12*a* and the ring side 12*b* are approximately perpendicular to each other. That is, the ring core 11 has an L-shaped cross section when seen along the axis direction. A longitudinal side of the L-shape of the ring core 11 opposes to the bottom 8*a* of the yoke 8, and the other side of the L-shape opposes to the outer circumference face of the transmittance core 5.

The biasing portion 13 is a ring member, and is fitted to the outer circumference face of the cylinder face 12*a*. When the biasing portion 13 is attached, the biasing portion 13 is compressed between the coil accommodation resin 9 and the ring face 12*b* in the axis direction. The biasing portion 13 is made of elastic member such as rubber or spring able to have an elastic deformation at least in the axis direction. Specifically, the biasing portion 13 is an elastic ring member made of resin such as O-ring or ring disk rubber having a predetermined thickness, or is made of metal such as wave washer or pan spring.

The biasing portion 13 has an inner diameter dimension in a manner that the biasing portion 13 is able to be fitted to the outer circumference face of the attachment portion 12 corresponding to the cylinder face 12*a*. When the biasing portion 13 has no load, a length of the biasing portion 13 in the axis direction is longer than a clearance distance between the coil accommodation resin 9 and the ring face 12*a* of the attachment portion 12 in the axis direction. When the biasing portion 13 is compressed between the coil accommodation resin 9 and the ring face 12*a* of the attachment portion 12 in the axis direction, the ring core 11 is pressed toward the bottom 8*a* of the yoke 8 by a restoring force of the biasing portion 13.

According to the first embodiment, the attachment portion 12 is defined only on the front and outer circumference side of the ring core 11, and the biasing portion 13 is incorporated onto the attachment portion 12. Therefore, the dimension of the inner circumference side of the ring core 11 can be maintained to be long in the axis direction. Thus, opposing area between which the ring core 11 and the transmittance core 5 overlap with each other can be sufficiently secured. That is, the ring core 11 can have enough passage area of the magnetic flux, and a transmitting amount of the magnetic flux can be maintained to be large.

As shown in FIG. 1B, the biasing portion 13 is located between the coil accommodation resin 9 and the ring face 12*b* of the attachment portion 12 in the axis direction. Therefore, a total dimension of the linear solenoid 1 in the axis direction can be restricted from becoming long by the dimension of the biasing portion 13. Thus, the total dimension of the linear solenoid 1 in the axis direction can be made short.

The linear solenoid 1 of the first embodiment is mounted to the electromagnetic hydraulic control valve, and the biasing portion 13 is located between the coil accommodation resin 9 and the ring core 11 in the axis direction. The total dimension of the linear solenoid 1 can be made short without a lowering of the magnetic flux. Therefore, the electromagnetic hydraulic control valve can be flexibly mounted to a vehicle, for example, corresponding to the hydraulic control device of the auto shift.

Second Embodiment

Figure 2:
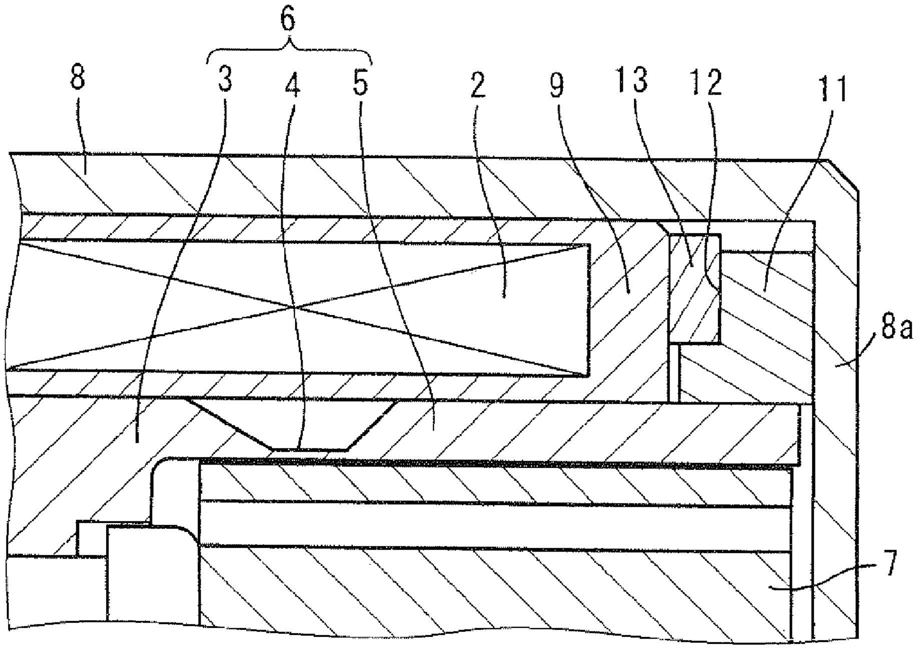
FIG. 2 is an enlarged cross-sectional view illustrating a linear solenoid according to a second embodiment.

A second embodiment will be described with reference to FIG. 2.

In the first embodiment, the rear end portion of the transmittance core 5 is located in the concave 34 of the bottom 8*a* of the yoke 8. The concave 34 is an important component for transmitting magnetism from the wall of the concave 34 to the transmittance core 5 in the radial direction. Therefore, high accuracy processing is required for the concave 34. Because the concave 34 is formed by cutting and shaving the bottom 8*a* of the yoke 8, a producing cost of the yoke 8 is increased by the processing of the concave 34.

In contrast, in the second embodiment, the magnetic flux is transmitted between the yoke 8 and the transmittance core 5 through the ring core 11. That is, the concave 34 is eliminated in the bottom 8*a* of the yoke 8, as shown in FIG. 2. At this time, all of the bottom 8*a* of the yoke 8 opposing to the ring core 11 and the stator core 6 is approximately flat without step.

Therefore, the yoke 8 can have the simple cup shape without the concave 34. Thus, the yoke 8 can be producing by only a pressing operation. Accordingly, the producing cost of the yoke 8 can be saved, and a producing cost of the control valve including the linear solenoid 1 can be reduced.

Third Embodiment

A third embodiment will be described with reference to FIG. 3.

In the first embodiment, the attachment portion 12 has the cylinder face 12*a* and the ring face 12*b*, and the ring core 11 has the L-shaped cross-section. The attachment portion 12 is located at least on the front and outer circumference side of the ring core 11 so as to shorten the dimension of the ring core 11 in the axis direction. The shape of the attachment portion 12 of the first embodiment is only one example. Alternatively, the attachment portion 12 may have other shape. That is, the ring core 11 is not limited to have the L-shaped cross-section.

Figure 3:
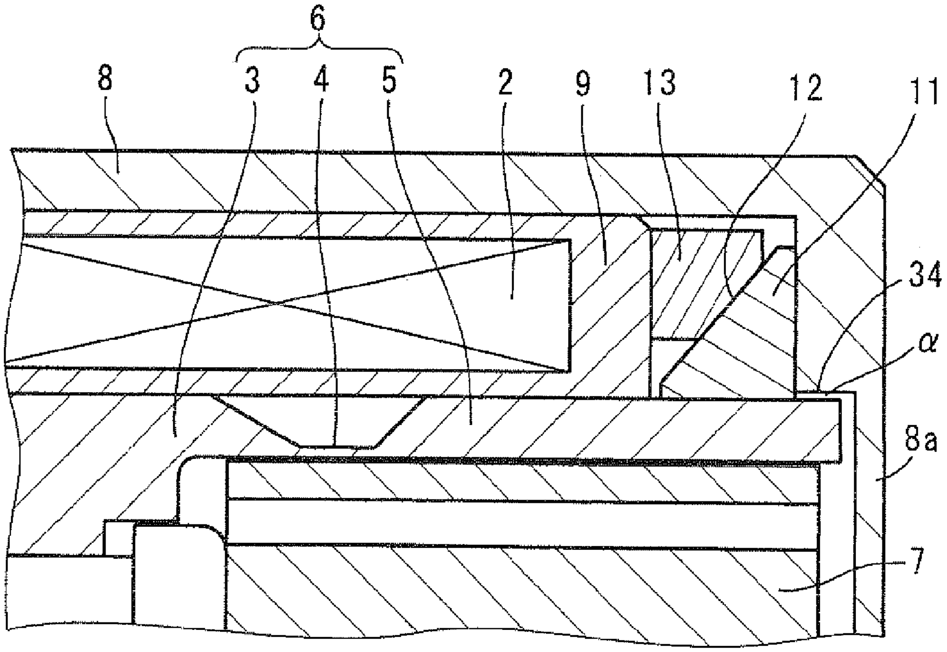
FIG. 3 is an enlarged cross-sectional view illustrating a linear solenoid according to a third embodiment.

In the third embodiment, as shown in FIG. 3, the attachment portion 12 has a taper shape, for example. An outer diameter dimension of the attachment portion 12 is decreased when the attachment portion 12 extends frontward. A contact face of the biasing portion 13 contacting the ring core 11 also has a taper shape corresponding to the taper shape of the attachment portion 12. The contact face is defined on an inner and rear face of the biasing portion 13.

The same advantage can be obtained in the third embodiment as the first embodiment. The third embodiment may be combined with the second embodiment.

Fourth Embodiment

A fourth embodiment will be described with reference to FIGS. 4A and 4B.

In the first embodiment, each of the attachment portion 12 and the biasing portion 13 has the ring shape all the circumferences.

In contrast, in the fourth embodiment, each of the attachment portion 12 and the biasing portion 13 is separated into plural parts. For example, each of the attachment portion 12 and the biasing portion 13 may be separated into two parts having curved shape. If each of the attachment portion 12 and the biasing portion 13 is separated into three or more parts, the ring core 11 can be prevented from being inclined. Further, the parts of the attachment portion 12 or the biasing portion 13 may be located at equal intervals. The parts of the attachment portion 12 or the biasing portion 13 may be located symmetrical relative to the center axis or line extending in the radial direction. Furthermore, each of the attachment portion 12 and the biasing portion 13 may have a C-shape. That is, a part of the ring shape may be eliminated.

Figure 4A:
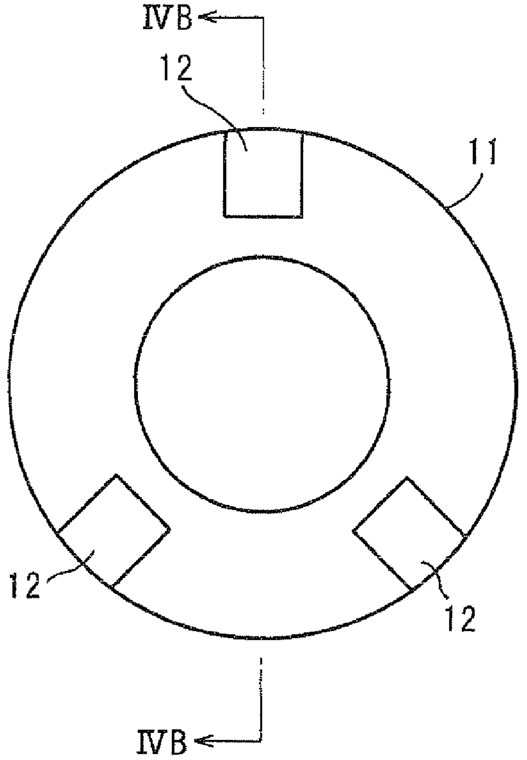
FIG. 4A is a schematic front view illustrating a ring core of a linear solenoid according to a fourth embodiment.
Figure 4B:
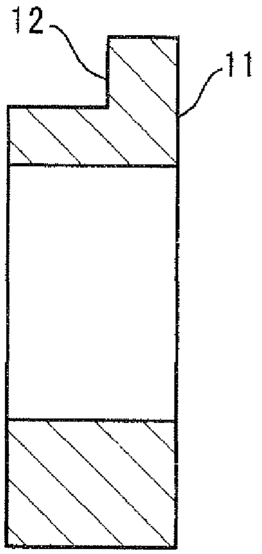
FIG. 4B is a cross-sectional view taken along line IVB-IVB of FIG. 4A.
Figure 5A:
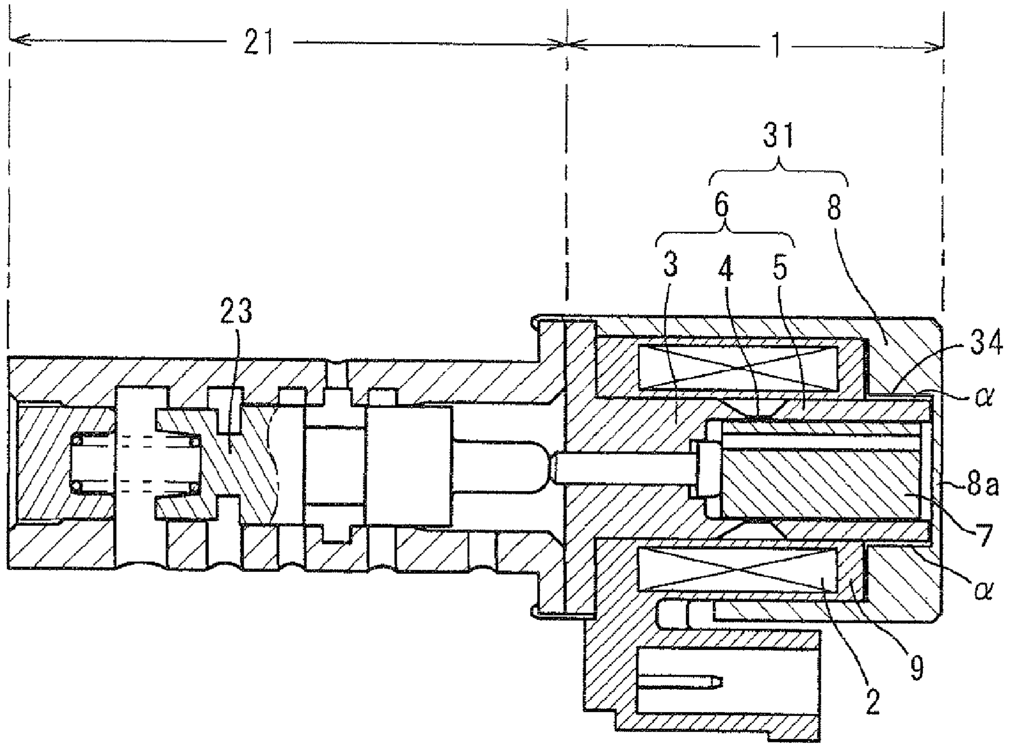
FIG. 5A PRIOR ART
FIG. 5A is a schematic cross-sectional view illustrating an electromagnetic spool valve including a linear solenoid of a first conventional example.
Figure 5B:
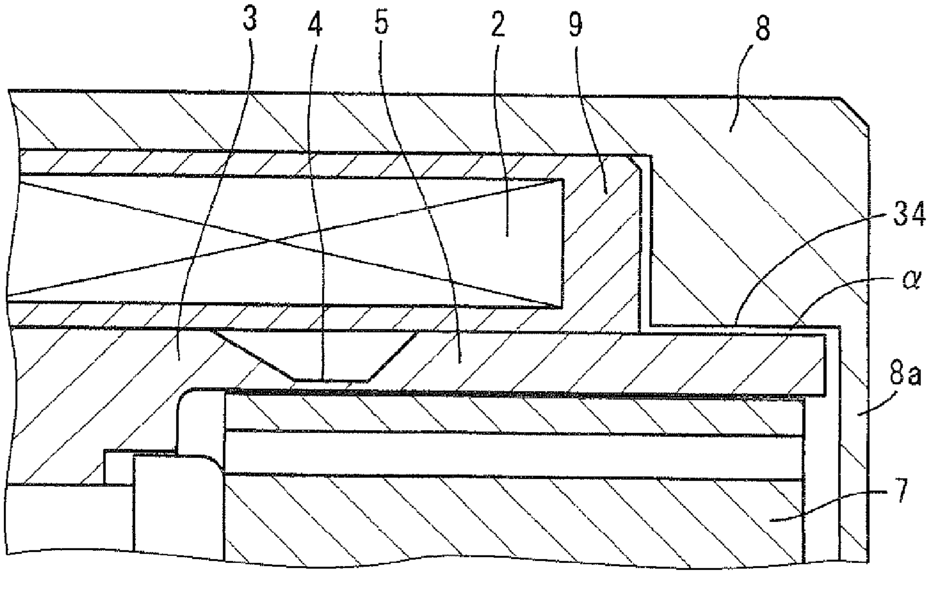
FIG. 5B PRIOR ART
FIG. 5B is an enlarged cross-sectional view illustrating the linear solenoid.
Figure 6A:
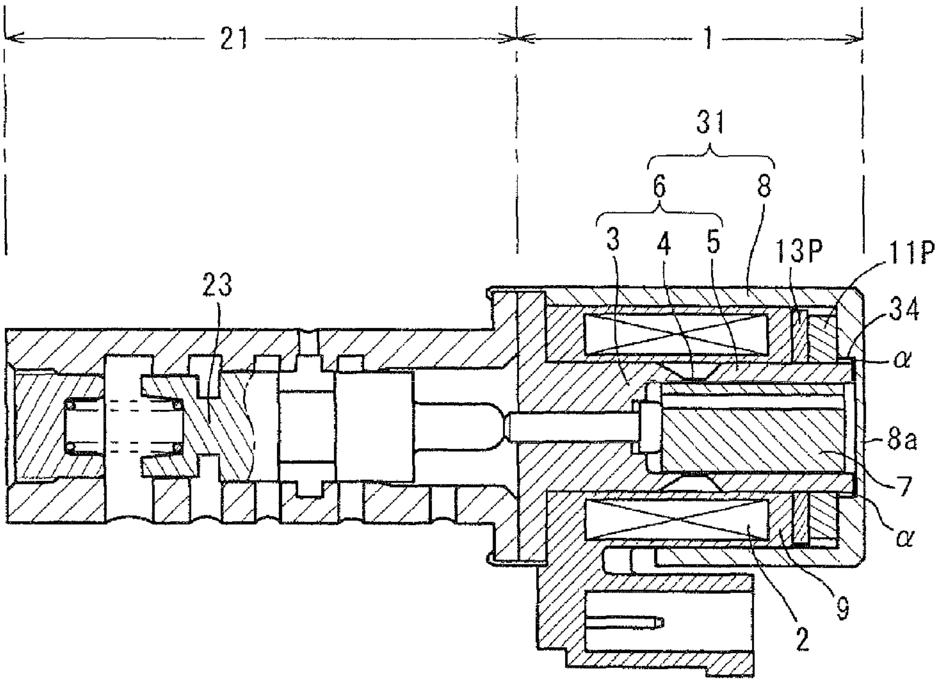
FIG. 6A PRIOR ART
FIG. 6A is a schematic cross-sectional view illustrating an electromagnetic spool valve including a linear solenoid of a second conventional example.
Figure 6B:
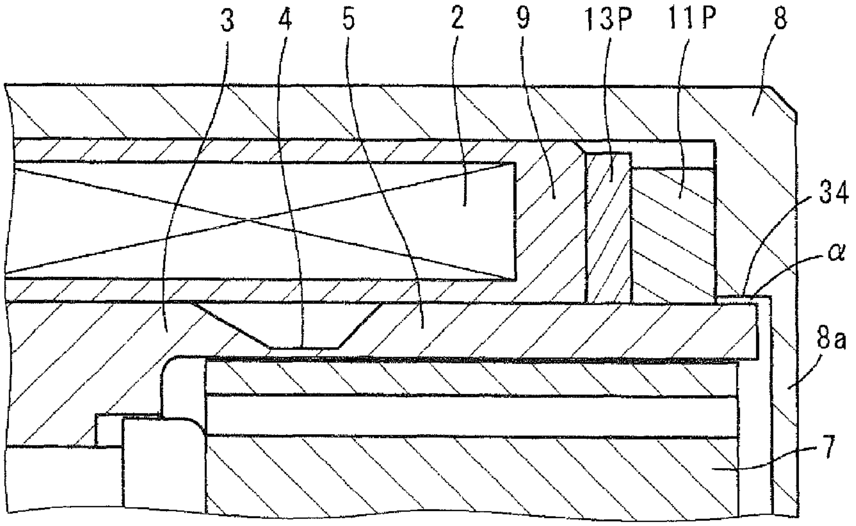
FIG. 6B PRIOR ART
FIG. 6B is an enlarged cross-sectional view illustrating the linear solenoid

As shown in FIG. 4A, three components of the attachment portion 12 are defined in the ring core 11, and are arranged symmetrical when seen in the axis direction. Alternatively, the three components may be arranged at equal intervals of 120°. The biasing portion 13 is disposed for each component of the attachment portion 12.

The same advantage can be obtained in the fourth embodiment as the first embodiment. The fourth embodiment may be combined with the second embodiment or the third embodiment.

The linear solenoid 1 is used for the control valve of the automatic shift in the above embodiment. Alternatively, the present invention may be applied to other control valve other than the automatic shift. Moreover, the present invention may be applied to a solenoid valve other than the electromagnetic hydraulic control valve.

The linear solenoid 1 is used for driving the spool valve 21 in the above embodiment. Alternatively, the linear solenoid 1 may be used for directly or indirectly driving an object other than the valve.

Such changes and modifications are to be understood as being within the scope of the present invention as defined by the appended claims.

What is claimed is:

1. A linear solenoid comprising:

a coil to generate a magnetic force by being supplied with electricity;

a tube-shaped coil accommodation resin to accommodate the coil;

a cup-shape yoke made of magnetic member to cover an outer periphery of the coil, the cup-shape yoke having a bottom and an opening opposite from each other in an axis direction;

a stator core made of magnetic member integrally having a magnetism attraction core fixed to an edge of the opening of the yoke, a magnetism transmittance core having an end portion unfixed to the bottom of the yoke, and a magnetism blocker located between the attraction core and the transmittance core, the unfixed end portion of the transmittance core being arranged to pass through the coil accommodation resin in the axis direction;

a plunger to directly slide on an inner circumference face of the transmittance core in the axis direction;

a ring core made of magnetic member located between the coil accommodation resin and the bottom of the yoke in the axis direction; and a biasing portion to bias the ring core onto the bottom of the yoke in the axis direction, wherein the ring core has an attachment portion to which the biasing portion is attached, and is fitted around an outer circumference face of the transmittance core so as to transmit magnetic flux with the transmittance core in a radial direction and so as to transmit magnetic flux with the bottom of the yoke in the axis direction, the attachment portion is located on an outer circumference side of the ring core, and is located adjacent to the coil, the biasing portion is configured to shorten a dimension of the ring core in the axis direction only on the outer circumference side, and the biasing portion is located between the attachment portion of the ring core and the coil accommodation resin in the axis direction.

2. The linear solenoid according to claim 1, wherein the ring core has an L-shaped cross-section along the axis direction.

3. The linear solenoid according to claim 1, wherein all of the bottom of the yoke opposing to the ring core and the stator core is approximately flat.

4. The linear solenoid according to claim 1, wherein the bottom of the yoke has a concave in which the unfixed end portion of the transmittance core is arranged.

5. The linear solenoid according to claim 4, wherein the concave is eliminated in the bottom of the yoke.

6. The linear solenoid according to claim 1, wherein the attachment portion is a step having an annular shape.

7. The linear solenoid according to claim 1, wherein the attachment portion has a cylinder face and a flat ring face approximately perpendicular to each other, the biasing portion is fitted to an outer circumference face of the cylinder face, and the biasing portion is contact with the ring face in the axis direction.

* * * * *